53-175 CROSS REFERENCE SEARCH ROOM

July 12, 1938. R. M. BERGSTEIN Re. 20,789

METHOD OF FORMING CONTAINERS

Original Filed July 8, 1936 2 Sheets-Sheet 1

INVENTOR.
ROBERT MORRIS BERGSTEIN.

BY Allen & Allen
ATTORNEYS.

CROSS REFERENCE SEARCH ROOM

July 12, 1938. R. M. BERGSTEIN Re. 20,789

METHOD OF FORMING CONTAINERS

Original Filed July 8, 1936 2 Sheets-Sheet 2

INVENTOR.
ROBERT MORRIS BERGSTEIN.
BY
Allen & Allen
ATTORNEYS.

Reissued July 12, 1938

Re. 20,789

UNITED STATES PATENT OFFICE 20,789

METHOD OF FORMING CONTAINERS

Robert M. Bergstein, Cincinnati, Ohio, assignor to Edna May Bergstein and himself, as trustees Original No. 2,095,910, dated October 12, 1937, Serial No. 89,539, July 8, 1936. Application for reissue April 26, 1938, Serial No. 204,382

18 Claims. (Cl. 93—36.01)

My invention relates to a mode of providing cartons with bags enclosed therein, which cartons are particularly adapted for shipment in knocked down form or flat folded condition, and for subsequent use in the packaging of oil or other liquid or greasy substances, or where air tight and moisture proof packaging is required.

This application relates to the process aspects of my application, Serial No. 43,569, filed Oct. 4, 1935, and illustrating also certain subject matter contained in my application Ser. 62,324, filed February 4, 1936.

The product, which I produce in accordance with the method herein described, can be formed either by hand or machine as an initially flat container, comprising an outer tubular element, a structure made of relatively stiff material, and an inner independently pre-formed flat pouch or bag, the liner being enclosed and adhesively fastened to the inner surface of the outer structure in flat form, and thus being adapted for erection and filling at the point of use by the same manipulations customarily practiced in the trade, together with the heat sealing of the open mouth of the package or bag, after contents have been inserted therein, independently of the closing of the closure flaps of the outer structure.

Introduction of liners into cartons has been practiced in several ways, one of which is merely to fasten a liner sheet, unformed, to the inner surface of the carton material, including closure flaps. Another practice is to pre-form a liner, in erect form, about a mandrel and push the mandrel with the pre-formed erect liner into the erected carton, thereby inserting the liner. The defect of the first of these two practices is that independent closures of the liner at either end of the carton, either before or after the contents have been inserted, are not possible. The defect of the second of the above two practices is that the user of the package is required to perform the operation of forming the liner in erect form, and after it is so formed, introduce same into erected carton, and in this practice it is impractical, if not impossible, to form tight seams, so as to bring about a hermetically sealed package, to provide the maximum protection for the contents, and furthermore the liner cannot be provided to fit snugly into the interior of the carton, and cannot be fully sustained at all points in holding the contents thereof by the relatively stronger material of the carton within which it is placed. Also, it has been found impractical, if not impossible, to use relatively thin or flimsy material, such as cellulose sheeting, or such material as is made from rubber, known as Pliofilm, in the second of the above practices, because of the mechanical difficulties of manipulating them.

Among other advantages incident to my method of forming a bag within a box, is the fact that since I form both the bag and the box in flat condition, I can apply pressure very readily to the completed structure during the period necessary for adhesion of the bag to the interior of the box, which adhesion is very desirable, since it results in a bag being opened when the carton is squared up ready for the reception of its contents.

One of the advantages of my method is that it permits me to employ in the manufacture of the bag or pouch element of the completed structure, a material which is heat sealable, constituting either the entire structure or the fused together interior of the completed pouch or bag. An example of such material is sheeted rubber hydrochloride, which I understand to be the composition of a product which has become known on the market by the trade name of Pliofilm.

Figure 8:
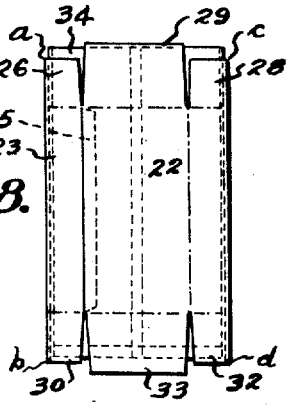

Fig. 8, the completed structure.

In producing my novel structure it is highly advantageous to follow the process which I will primarily outline, and which can be followed by the use of automatic machinery of which various forms will be adaptable. I have produced a machine for carrying out the method which will be described and the novel features of which will be set forth in a companion application.

I will describe a practice with reference to an ordinary carton, i. e. a four walled tubular structure made in flat form, with closing flaps at both ends, and which is shipped flat and when used is opened, the flaps closed at the bottom, the contents introduced and the flaps then closed at the top. The form illustrated will be one wherein the closing flaps are adhesively secured in closed position. This is of course, but one

SEARCH ROOM style, as interlocking flaps or tuck in styles of flaps can be employed.

I will also describe my invention as using as an example the heat fusible rubber material "Pliofilm" or some other sheet material which can be used for wrapping and is itself heat fusible, it being understood, however, that if material were used for the bag element of the combination which requires provisions either for adhesive coating in strips, which will be at the inside face thereof, these strips to be used for sealing the ends and seams of the bag material, or a complete coating of a protective material, portions of which would be used to form joints, whether on the side or the end of the tube thereof; this would be merely an additional step, which step has already been described in my co-pending cases to which reference has been made above.

The practice as described starts with one or more continuous strips or rolls of either fusible transparent or non-transparent material, or a non-fusible material having a fusible coating applied to the inner surface of the tube material and with carbon blanks which have previously been prepared, cut and scored, printed or unprinted. I have illustrated such blank as 1, having side walls 2 and 3, end walls 4 and 5, and glue flap 6, and closing flaps 7, for one end and 8 for the other end. These blanks are fed one by one along a conveyor.

The sheet 9 of material is caused to pass over a forming plate, over which it is folded to form a lap 10.

In the diagram it is indicated that a hot roll bears on the lapped over portions and serves to fuse them into an impermeable sealed seam 10, and to make a tube of the material. The illustration indicating the heat sealing practice is intended to be diagrammatic, various practices being possible.

The tube is caused to move along, as by feed rollers, until it comes to a point where a heated iron is pressed across it at spaced intervals, causing the end portions of the tube material to become permanently combined; where a non-fusible material is used and a fusible coating is applied to restricted or pre-determined internal areas, namely: what is to be the end of the tube, the sealing by means of a heated iron operation is synchronized and co-ordinated with the predetermined coated surfaces. Where the entire internal surface is coated with said fusible material, such synchronization is not essential, as the iron will fuse the material wherever contact is made.

The tube is still drawn along by feed rollers until it comes to a fly knife of suitable construction, which cuts the tube adjacent the transverse sealed portion. It may be advantageous with some materials to cut across the material incompletely to facilitate further feeding. This transverse cut is illustrated at 12.

It can be noted that so far provision has been made for forming a continuous tube, with sections of desired length, having their one end sealed shut, but still clinging together for feeding purposes. In the illustrated example the bags formed of the tube sections are combined with the carton.

As each carton blank is fed along it is passed through glue wheels which apply adhesive to the under side of the glue flap 6, and also apply adhesive as illustrated in the form of spots or small areas 13, near the trailing end of the blanks on upper side, or inside walls of carton, on the two side walls 2 and 3, and on the two end walls 4 and 5. Instead of spots, lines of adhesive could be employed.

Suitable feed rolls engage the tube material close to the point where it is to be applied to the carton blank. This feed will be more rapid than the delivery from the knife, which may, if desired, be followed by a feed device causing the tube to move at its previous speed. The pull of the more rapid feed will serve to break apart the connecting portions left by the nicks in the knife, and supply individual bags with their sealed end foremost to the carton blanks. Since the blanks must necessarily be spaced in feeding, for accuracy in operations, and since the original tube is formed continuously, this pick up in the speed of movement in the bags will compensate for the spacing of the carton blanks.

The delivery of the bag being synchronized with the movement of the carton, it will be deposited upon the walls 3 and 4, the length of the bag being slightly larger in dimension will overlap score lines, separating wall panels and adjacent panels. The bag can thereafter be retained in position on the moving carton by means of rolls holding same down, and, in addition thereto, lines or spots of adhesive, causing the bag to cling to the carton.

The usual practice of forming the tubular carton then takes place by folding the wall 2 and glue flap 6 of the carton, and then turning the end wall 5 over the edge thereof to overlap the glue flap 6. This operation also brings the spots of glue on the side wall 2 and the end wall 5 against the bag, so that it is adhesively secured to all four walls. Ordinarily the length of the bag will be such that its open end does not project beyond the closing flaps 7 at the trailing end of the carton.

With the very flexible, light material it is a decided advantage to apply the sealed end to the carton in advance, because this is the least flimsy portion of the bag. With other material it will be subject to the wishes of the operator whether the cross seams be cut off ahead or behind the moving tube.

As so far described, I have produced a carton of the usual type with a bag sealed in a simple seam into a tube lengthwise of the carton, with its end sealed shut, and with adhesive holding the material of the bag to the carton walls. I prefer that the bag be a little oversize, i. e., larger than the inside of the carton, and have so illustrated it. This will permit the bag to find support throughout in the carton. To this end it may also be desirable to lay the closed seam further over the ultimate bottom closing flaps of the carton than I have illustrated, so as to result in ultimate bottom support for the contents of the bag if this is necessary.

While I have shown a single seam lapped seam tube; it is equally as easy to use two strips of paper and fold one of them over the other at each side of the tube former, which is a well known way of making a lapped seam tube.

The carton is then ready for shipment, and looks on the outside like any other carton.

Instead of making the bag entirely of heat fusible material, another mode of procedure is to employ for a bag a sheet of some suitable flexible material such as paper, and adhesively secure thereto the heat fusible sheet, except for a projecting portion which is used for heat sealing the inner sheet to itself along a different line than the paper material of the bag is secured.

Also it is within the scope of my invention to form any kind of a flat bag, whether of heat sealable or impermeable material or not, and associated in a manner noted with the carton.

It would of course, also be practical to supply to an operative a succession of cut and scored blanks, and a succession of flat bags and have her secure the bags by hand within the boxes prior to gluing the boxes themselves, resulting in a completed flat article with the flat pouch within it. I have spoken of applying pressure to the completed article to secure the adhesion between the pouch and the carton, but the ordinary carton manufacturing machinery will perform this operation. Also since the packages are formed in the flat, successive boxes can be stacked in some sort of container, thus holding the adhesive junctures together for an extended period until the boxes are removed at point of use, from whatever container they are packed in.

Figure 1:
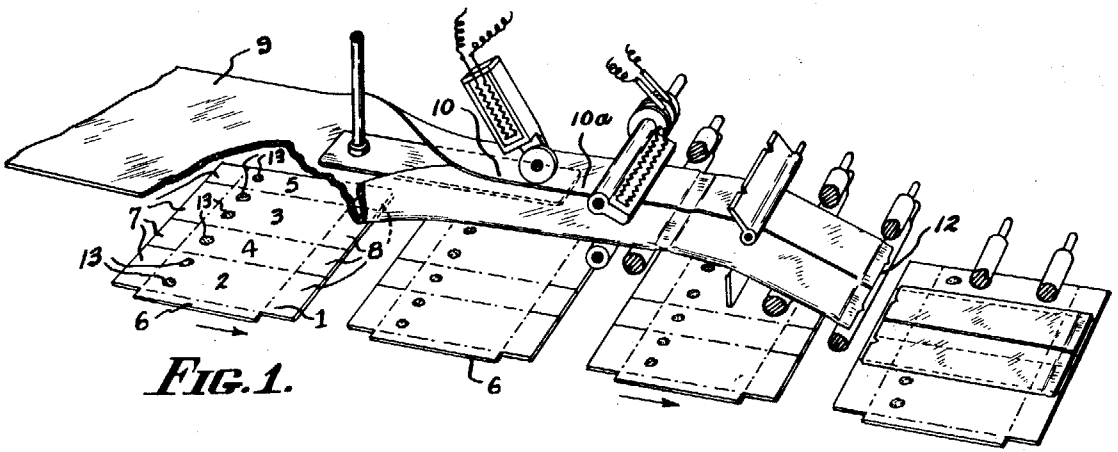
Fig. 1 is a diagram illustrating a mode of procedure following my invention.
Figure 2:
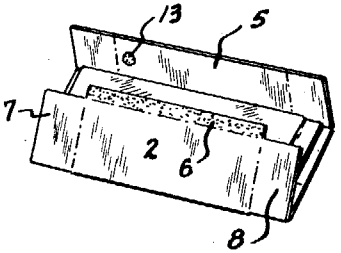
Fig. 2 is a perspective illustrating a step in the procedure according to my invention.
Figure 3:
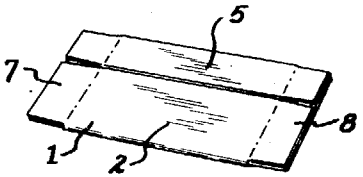
Fig. 3 illustrates the completed product.
Figure 4:
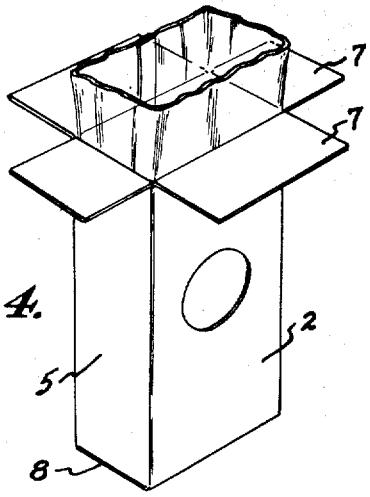
Fig. 4 illustrates the product when set up and ready for filling.
Figure 5:
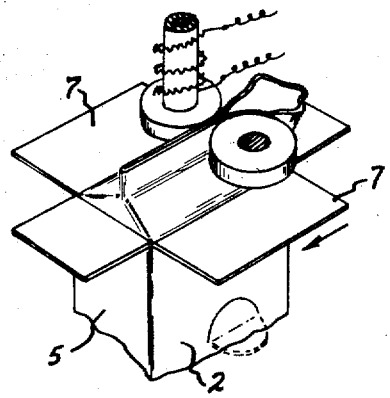
Fig. 5 illustrates the heat sealing of the completed and filled package.
Figure 6:
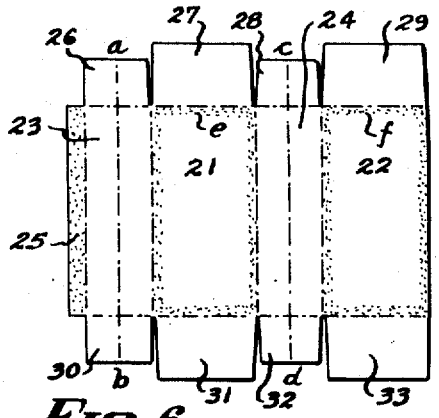
Fig. 6 illustrates another form of carton.
Figure 7:
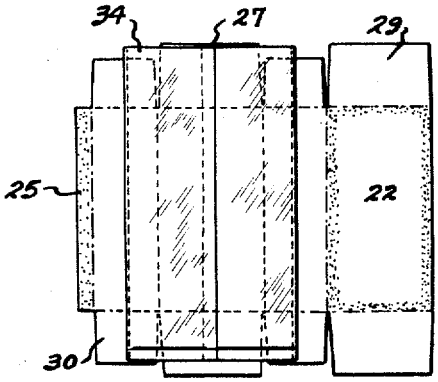
Fig. 7 illustrates a mode of application of the bag thereto.

Referring briefly to the alternative style of carton, I have shown in Fig. 6, a carton blank having what may be termed side walls 21 and 22, end walls 23 and 24, and closing flaps 26, 27, 28, 29, 30, 31 and 32, 33, for the several walls, at both ends of the structure. There is also a glue flap 25 used in closing the carton.

The distinctive feature of this carton lies in the fact that the end walls 23, 24 are formed with a crease or fold line *ab*, *cd*, and in the operation of forming the completed article, it is folded about the bag on the said lines *ab*, *cd*. In this construction I have illustrated the panels of adhesive at *e* and *f*, on what I have termed the side walls of the final structure. In following out my practice, the pouch 34 will be deposited on the carton blank while the same is flat, and thereupon the carton will be folded over on the lines *ab*, *cd*, and the closing flap 25 will be secured either under or on top of the edge of the wall 22.

Although the practice is the same in this construction in its essential details, the completed article is different in that when the structure is erected, the faces of the bag will be drawn apart in parallel planes, because the walls 21 and 22 are spread directly apart when the crease lines *ab* and *cd* are pushed inwardly. In this construction particularly, and where hermetic sealing is not so much desired, pouches or bags may be employed having a satchel type of bottom, care being taken to so apply the adhesive between the carton and the bag that the bottom is free to be pulled into a flat condition across the end of the carton when the structure is erected.

The advantages of the several structures noted in industrial use are covered at some length in my co-pending applications, Ser. Nos. 43,569, and 62,324, to which reference has hitherto been made.

Having thus described my invention, what I claim as new and desire to secure by Letters Patent, is:—

1. That method of container manufacture which consists in providing cut and creased carton blanks, forming flat bags closed at one end, and thereafter depositing them in desired position on the blanks while flat, there being adhesive interposed between the blank and the bag, and then folding the blanks into a flat form and fastening the overlapping edges thereof, whereby a flat container is formed with the bag in place therein and adhesively secured therein.

2. That method of container manufacture which consists in providing flat tubular bag material, having heat fusible portions, cutting the tube into bag sections and heat fusing the one end of each section to form a flat bag closed at one end, providing cut and creased carton blanks, depositing the bags on the blanks and in the presence of adhesive folding over and adhesively securing the blanks into flat tubular bodies about the bags, for the purpose described.

3. That method of container manufacture which consists in providing lapped seam tubes in flat bag length sections, sealed together at one end, thereafter depositing the flat bags so formed on carton blanks prior to folding same into tubular form, and then folding and gluing the carton blanks.

4. That method of container manufacture which consists in providing lapped seam tubes in flat bag length sections, sealed together at one end, thereafter depositing the flat bags so formed on carton blanks prior to folding same into tubular form, and then folding and gluing the carton blanks, adhesive being supplied to secure the bags to the carton blanks other than at the closing flaps thereof.

5. That method of container manufacture which consists in providing flat bags closed at one end, providing cut and scored carton blanks, and depositing the bags on the blanks while unfolded in position to overlie the closing flaps at the end of the blank over which the closed end of the bags lie, and then folding over the blanks and adhesively securing the overlapping portions thereof.

6. That method of container manufacture which consists in providing cut and creased carton blanks, forming flat bags closed at one end, and depositing them in desired position on the blanks while unfolded, there being adhesive interposed between the blank and the bag, and then folding the blanks into a flat tubular form and fastening the overlapping edges thereof, whereby a flat container is formed with the bag in place therein and adhesively secured therein, said adhesive being applied to engage the bag and at least two opposite panels of the carton.

7. That method of container manufacture which consists in providing flat tubular bag material, having heat fusible portions, cutting the tube into bag sections and heat fusing the one end of each section to form a flat bag closed at one end, providing cut and creased carton blanks, depositing the bags on the blanks and in the presence of adhesive folding over and adhesively securing the blanks into flat tubular bodies about the bags, for the purpose described, said adhesive being applied to engage the bag and at least two opposite panels of the carton.

8. That method of container manufacture which consists in providing lapped seam tubes in flat bag length sections, sealed together at one end, thereafter depositing the flat bags so formed on carton blanks prior to folding same into tubular form, and then closing and gluing the carton blanks, adhesive being supplied to secure the bags to the carton blanks, said adhesive being applied to engage the bag and at least two opposite panels of the carton.

9. That method of container manufacture which consists in providing flat bags closed at one end, providing cut and scored carton blanks, and depositing the bags on the blanks while both bags and blanks are flat in position to overlie the closing flaps at the end of the blank over which the closed end of the bags lie, and then folding over the blanks and adhesively securing the overlapping portions thereof, said adhesive being applied to engage the bag and at least two opposite panels of the carton.

10. That method of container manufacture which consists in providing cut and creased carton blanks, forming flat bags closed at one end, and depositing them in desired position on the blanks while both bags and blanks are flat, there being adhesive interposed between the blank and the bag, and then closing the blanks into a flat form and cementing the overlapping edges thereof, whereby a flat container is formed with the bag in place therein and adhesively secured therein, pressure being applied to the resulting flat article to secure adhesion of the carton and bag.

11. That method of container manufacture which consists in providing flat tubular bag material, having heat fusible portions, cutting the tube into bag sections and heat fusing the one end of each section to form a flat bag closed at one end, providing cut and creased carton blanks, depositing the bags on the blanks and in the presence of adhesive folding over and adhesively securing the blanks into flat tubular bodies about the bags, for the purpose described, pressure being applied to the resulting flat article to secure adhesion of the carton and bag.

12. That method of container manufacture which consists in providing lapped seam tubes in flat bag length sections, sealed together at one end, thereafter depositing the flat bags so formed on carton blanks prior to folding same into tubular form, and then closing and gluing the carton blanks, adhesive being supplied to secure the bags to the carton blanks, pressure being applied to the resulting flat article to secure adhesion of the carton and bag.

13. That method of container manufacture which consists in providing flat bags closed at one end, providing cut and scored carton blanks, and depositing the bags on the blanks while both bags and blanks are flat in position to overlie the closing flaps at the end of the blank over which the closed end of the bags lie, and then folding over the blanks and adhesively securing the overlapping portions thereof, adhesive being applied between the body of the blank and the bag, and pressure being applied to the resulting flat article to secure adhesion of the carton and bag.

14. That method of container manufacture which consists in depositing a formed flat tubular liner in a predetermined position on a flat carton blank and thereafter folding the blank and securing the opposite edges of the same to close the carton about the liner.

15. That method of container manufacture which comprises providing cut and scored carton blanks, said blanks having intermediate fold lines on two opposite side panels of the blank, providing flat bags closed at one end, and depositing said bags in desired position on the blanks while flat, there being adhesive applied so as to secure the bags at least to the other two side panels of the blank, and then folding the blanks on the said intermediate fold lines and fastening the overlapping edges of the blank, whereby a flat container is provided with a bag adhesively secured in place therein.

16. The method of container manufacture which consists in depositing a formed flat tubular liner in a predetermined position on a flat carton blank and thereafter folding the blank and securing the opposite edges of the same to close the carton about the liner, adhesive being supplied to secure the liner to the carton blank at two opposite walls thereof at least, so that when the carton is opened, the liner will be opened.

17. That method of container manufacture which consists in depositing a formed flat tubular liner in a predetermined position on a flat carton blank and thereafter folding the blank and securing the opposite edges of the same to close the carton about the liner, said liner being of a length and so deposited upon the flat carton blank that its ends overlie the closing flaps of the carton blank at both ends of said blank.

18. That method of container manufacture which consists in depositing a formed flat tubular liner in a predetermined position on a flat carton blank and thereafter folding the blank and securing the opposite edges of the same to close the carton about the liner, said tubular liner having a lengthwise heat fused seam therein prior to deposit on the carton blank, and the interior at least being of heat fusible material.

ROBERT M. BERGSTEIN.